US012566938B1

(12) United States Patent
Yazdanshenas

(10) Patent No.: US 12,566,938 B1
(45) Date of Patent: Mar. 3, 2026

(54) ROTATIONAL MAGNETIC SET COUNTER WITH AN ELASTIC RADIAL DOUBLE CAM MECHANISM

(71) Applicant: Bevel Edge PLLC, Richardson, TX (US)

(72) Inventor: Alireza Yazdanshenas, Richardson, TX (US)

( * ) Notice: Subject to any disclaimer, the term of this patent is extended or adjusted under 35 U.S.C. 154(b) by 0 days.

(21) Appl. No.: 19/223,084

(22) Filed: May 30, 2025

Related U.S. Application Data

(60) Provisional application No. 63/653,920, filed on May 30, 2024.

(51) Int. Cl.
*G06M 1/24* (2006.01)
*G06M 1/04* (2006.01)

(52) U.S. Cl.
CPC ............ *G06M 1/248* (2013.01); *G06M 1/045* (2013.01)

(58) Field of Classification Search
CPC .............................. G06M 1/248; G06M 1/045
USPC ......................................................... 235/103
See application file for complete search history.

(56) References Cited

U.S. PATENT DOCUMENTS 6,779,480 B2 * 8/2004 Zamjahn ................ G09F 11/23 215/230
7,555,995 B1 7/2009 Stump et al.
7,628,315 B2 12/2009 Duncan
7,934,638 B2 5/2011 Lee
8,281,733 B2 10/2012 Kreshek
8,857,617 B2 10/2014 Balakier et al.
9,021,981 B2 5/2015 Raiti de Boyles
9,134,288 B1 9/2015 Ettinger
9,492,356 B2 11/2016 Balakier et al.
10,610,456 B2 4/2020 Gosselin et al.
2003/0066874 A1 * 4/2003 Davignon, II ....... A63B 57/353 235/108
2007/0076529 A1 4/2007 Lin
2007/0109915 A1 5/2007 Howell
2009/0025625 A1 1/2009 Lee
2009/0288321 A1 * 11/2009 Firestone ................ G09F 11/04 40/447
2012/0255482 A1 10/2012 Terenzoni
2012/0314832 A1 12/2012 Arrow
2014/0295998 A1 10/2014 Gilbert
2014/0354407 A1 12/2014 Evans
(Continued)

FOREIGN PATENT DOCUMENTS

WO WO2017084475 A1 5/2017

*Primary Examiner* — Daniel A Hess
(74) *Attorney, Agent, or Firm* — Bold IP, PLLC; Houda El-Jarrah

(57) ABSTRACT

A magnetic rotational set counter. The magnetic rotational set counter includes a front plate connected to a back plate. In between the front plate and the back plate, there is a number disk having a magnet inserted in a central cavity of the number disk. A ticker is included which has an elongated arm and an end piece. A display window is integrated into a front of the front plate. The number disk has an array of chronologically ordered numbers. A single number is shown from the display window of the front plate when the user turns the bottom portion of the number disk, which protrudes from an access window between the front plate and the back plate. The number disk is configured to rotate in a single direction in a forward direction. The ticker and number disk are configured to prevent miscounting.

11 Claims, 10 Drawing Sheets

(56) References Cited

U.S. PATENT DOCUMENTS

| | | | |
|---|---|---|---|
| 2018/0050258 | A1 | 2/2018 | Russell |
| 2021/0267395 | A1 | 9/2021 | DiPasquale et al. |
| 2023/0347221 | A1 | 11/2023 | Paavola |

* cited by examiner

ROTATIONAL MAGNETIC SET COUNTER WITH AN ELASTIC RADIAL DOUBLE CAM MECHANISM

CROSS-REFERENCE TO RELATED APPLICATIONS

This application is a non-provisional patent application which claims priority to U.S. Provisional Patent Application No. 63/653,920, which was filed on May 30, 2024, which is incorporated by reference in its entirety.

FIELD OF THE DISCLOSURE

The disclosure relates generally to a rotational magnetic exercise set counter that includes the ability to be magnetically connected to metal objects and serve as a counter of exercise sets. The rotational magnetic exercise set counter further includes a radial elastic double cam mechanism that reduces the chance for miscounting.

BACKGROUND

Different counters exist that can be used by exercise goers and weight lifters in particular to display a number related to the number of sets that the user has undertaken of the particular exercise or set in question. Most counters are handheld or have clips to clip onto a user's clothing or bag. More often than not, gym patrons or other exercisers may forgo the use of counters throughout their exercise routine and rely instead on memory or other inconvenient methods, such as chalkboards or dry erase boards to count their exercise sets performed.

SUMMARY

The present description provides one or more non-limiting embodiments for a magnetic rotational set counter, comprising at least one magnet as well as a number disk. The number disk may comprise a set of numbers on a front side of the number disk, wherein the number disk is generally circular in shape and includes a plurality of notches on an outer edge or profile of the number disk and a central cavity, wherein the magnet is inserted into the central cavity of the number disk. The magnetic rotational set counter may further comprise a ticker, wherein the ticker comprises an elongated arm and an end piece on the elongated arm, and a back plate. The back plate may further comprise a body having a set of holes for receiving fasteners therethrough and a housing to house the ticker on the back plate. The set counter may further comprise a front plate, wherein the front plate is attached to the back plate, wherein the number disk is positioned between the front plate and the back plate and in front of the magnet, and wherein an access window is formed at a bottom section of the magnetic rotational set counter, wherein the access window is formed between the front plate and the back plate. The bottom portion of the number disk protrudes through the access window such that one or more notches of the plurality of notches are visible through the access window at the bottom section of the magnetic rotational set counter.

The set counter, according to one or more non-limiting embodiments, may further include a display window in the front plate for displaying a single number from the set of numbers on the number disk, whereby the display window is an opening in the front plate sized to display the single number from the set of numbers. There may be a single number from the set of numbers on the number disk that is visible when looking at a front side of the magnetic rotational set counter. The numbers of the set of numbers are arranged in chronological order on the number disk. The elongated arm and the end piece of the ticker are configured to move from a straight, stationary position to a bent turned position when the number disk is rotated in a forward direction at the access window of the magnetic set rotational counter. The number disk has raised portions above each notch of the plurality of notches. The end piece of the ticker is configured to fit into a notch of the plurality of notches on the number disk, and wherein the end piece of the ticker is either at rest in the notch of the plurality of notches or bent to one side on a raised portion of the raised portions while the number disk is turning. A top piece of the ticker is a horizontal piece and the elongated arm and the end piece are connected to a center of the top piece or are integrally formed with the ticker. The end piece of the ticker may be cylindrically shaped. A magnet may be trapped in place inside of the cavity of the number disk and also between the back plate and the front plate of the magnetic rotational set counter.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present description includes one or more non-limiting embodiments for a rotational magnetic exercise set counter for reliably counting the number of exercises set performed or remaining without the risk of miscounting. Th rotational mechanism included on the counter may be activated by a hand or finger and allows the user to swiftly change the number displayed. Further, the counter includes an elastic radial double cam (ERDC) mechanism that locks the displayed number in place until the user is ready to intentionally switch the number. The magnetic ability allows the user to conveniently hang up or display the set counter, as described herein in one or more non-limiting embodiment, onto metallic equipment, including metallic gym equipment so the user can visually see the counter and access the dial to count along with the sets the user performs. The set counter is designed such that the number dial or number disk as also referred to herein cannot be assembled incorrectly or backwards. The magnetic rotational set counter includes a display window for displaying the number that the user has reached in performing his or her set for a particular set of weightlifting repetitions or exercises. In a non-limiting embodiment, the set counter may include a front plate attached to a back plate. Interior to the front plate and back plate may be a fixed number disk, a magnet, and a ticker held in place between the front plate and the back plate. Additional information is provided with respect to the accompanying figures.

Figure 1A:
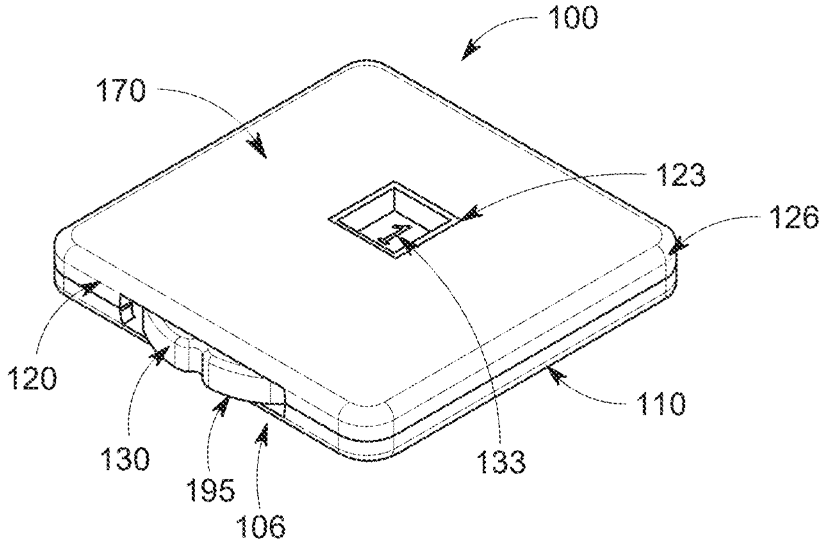
FIG. 1A is a pictorial illustration of a top perspective view of a magnetic rotational set counter.
Figure 1B:
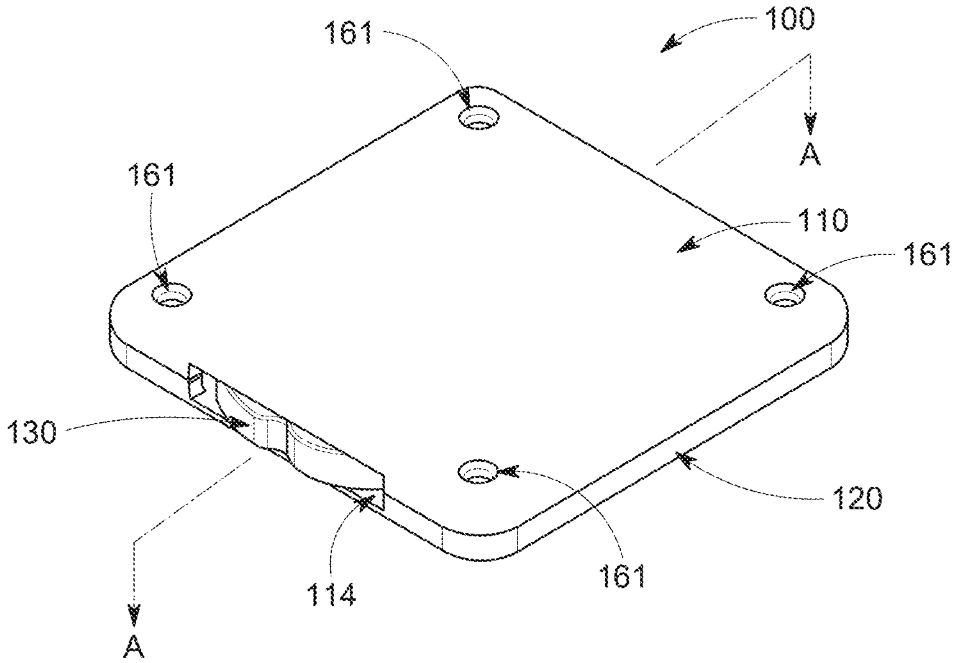
FIG. 1B is a pictorial illustration of a rear view of a magnetic rotational set counter with sectional line A-A shown in FIG. 1B.

FIG. 1A shows a top perspective view of a magnetic rotational set counter 100 according to one or more non-limiting embodiments. FIG. 1B shows a rear view of the magnetic rotational set counter 100. It is noted that the terms "magnetic rotational set counter" is interchangeable with "set counter" or "rotational set counter" herein.

As shown in FIGS. 1A and 1*n* FIG. 1B, the magnetic rotational set counter 100 may include a front plate 120 attached to a back plate 110. A number disk 130 is integrated into the interior of the set counter 100 between the front plate 120 and the back plate 110. The number disk 130 is visible through an access window 114. The access window 114 is formed from the connection between the front plate 120 to the back plate 110 and the gap made between the front plate 120 and the back plate 110 on an underside 106 of the assembled set counter 100 as shown in FIG. 1A in a non-limiting embodiment.

Figure 4A:
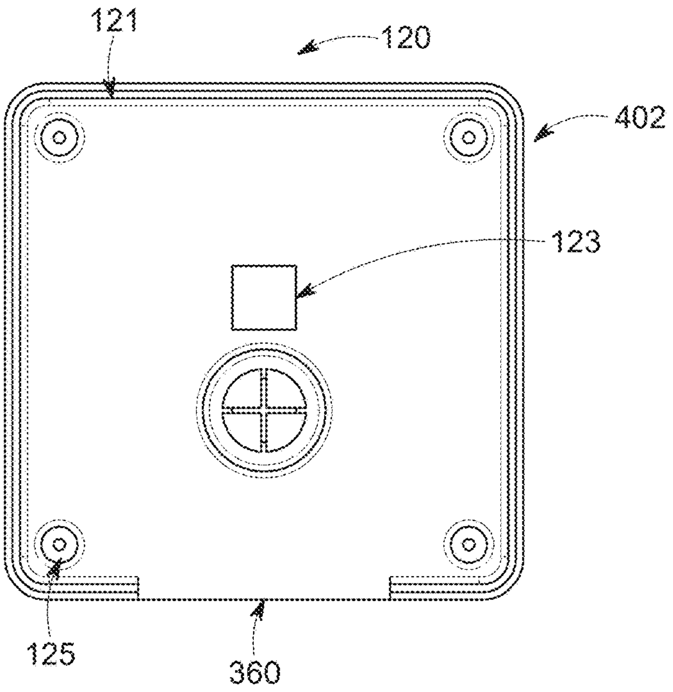
FIG. 4A is a pictorial illustration of the rear side surface of the front plate of the set counter.
Figure 4B:
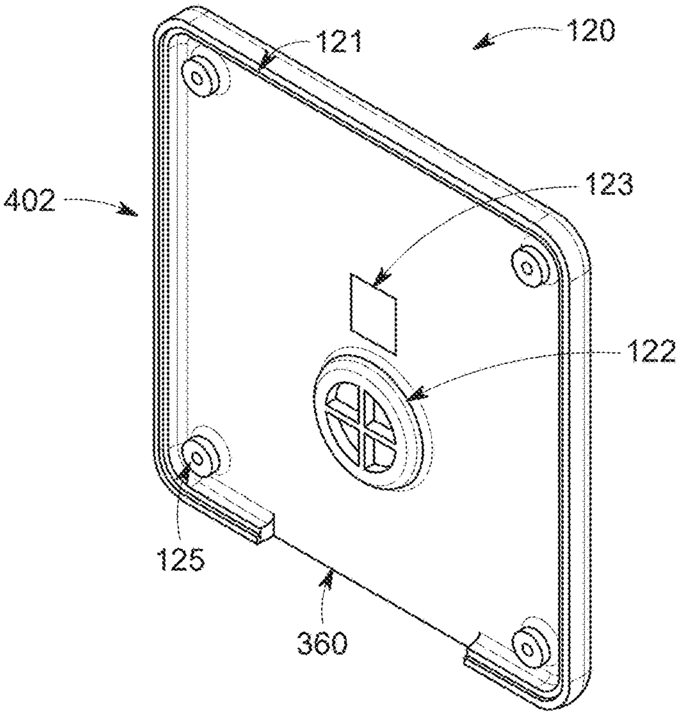
FIG. 4B is a pictorial illustration of the rear side surface of the front plate of the set counter.

FIG. 1A further shows that a display window 123 may be integrated into the front plate 120. Display window 123 may be formed as a cutout, recessed window in the front plate 120. FIG. 4A and FIG. 4B further illustrate display window 123 in a view looking at a rear side surface 402 of the front plate 120. The display window 123 allows the viewer to see a number, such as number 133, shown in FIGS. 1A and 1*n* FIG. 1E. The number 133 is intended to represent the set number that a user has reached while exercising and/or weightlifting. As noted above, the magnetic rotational set counter 100 is intended to function as a physical, tangible counter and visual display system to the user to remind the user what set the user has reached in terms of the number of exercises that the user has reached to that point. The exercises may be related to any type of exercise, including but not limited to, weightlifting exercises, body weight exercises, aerobic or cardiovascular exercise, or any other type of exercise requiring repetition as well as groups or sets of exercises.

FIG. 1B shows a rear view of the back plate 110 of the set counter 100. As shown in FIG. 1B, the back plate 110 may be attached to the front plate 120 using retention fasteners (e.g. screws 160 shown in FIG. 1D) that fit through the fastener holes 161 positioned around the sides of the back plate 110. Other means of attachment may alternatively be used in other embodiments including via VELCRO or adhesive or other means of attachment known in the art.

Figure 1C:
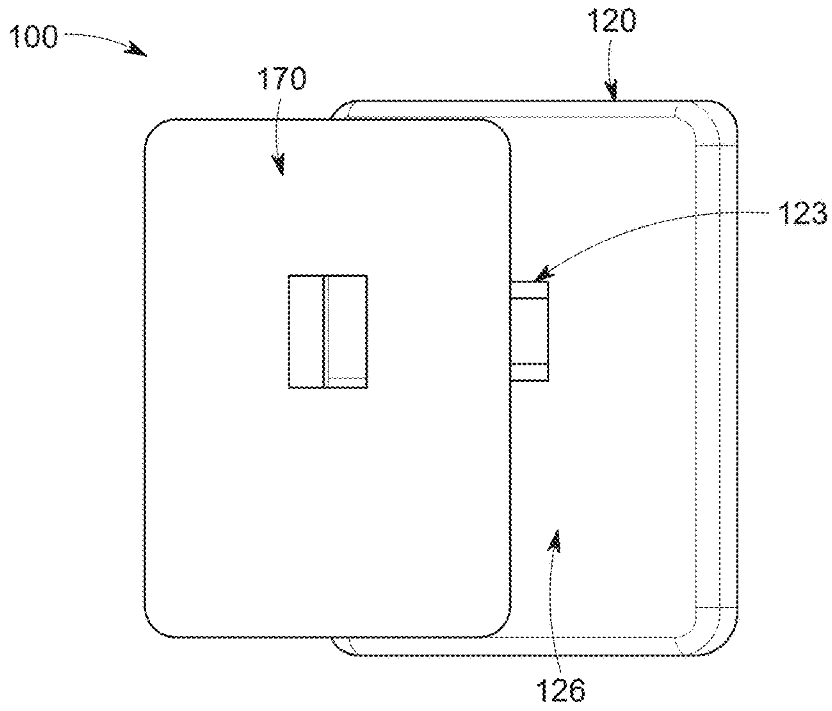
FIG. 1C is a pictorial illustration of the magnetic rotational set counter with an adhesively attachable display shown in front of the magnetic rotational set counter.

FIG. 1C shows that there may be a front piece 170 that is adhesively or magnetically attached to the actual front side 126, as shown in FIG. 1C, of the front plate 120. The removable front piece 170 may incorporate a cutout window that matches the position and size of display window 132 that is integrated into the front plate 120 to facilitate that the displayed set number 133 is visible through the display window 123.

The front piece 170 may be useful to serve as a blank piece for motivational says or slogans to inspire the user of the set counter 100. Alternatively, any other images or text may be included on the set counter 100, including but not limited to, advertising or promotional material for one or more business entities or organizations. The display window 123 is visible through the front plate 120 (e.g. as shown in FIGS. 1A and 1*n* FIG. 1F), including from the actual physical front surface 126 of the front plate 120 and through the front attachment piece 170 of the set counter 100 such that the user can see a number, such as number 133, from number disk 130 displayed through the display window 123 of the set counter 100. The display window 123 may be a cut out that is machined into or cut into the body of the front plate 120 so as to be part of the front plate 120.

Figure 1D:
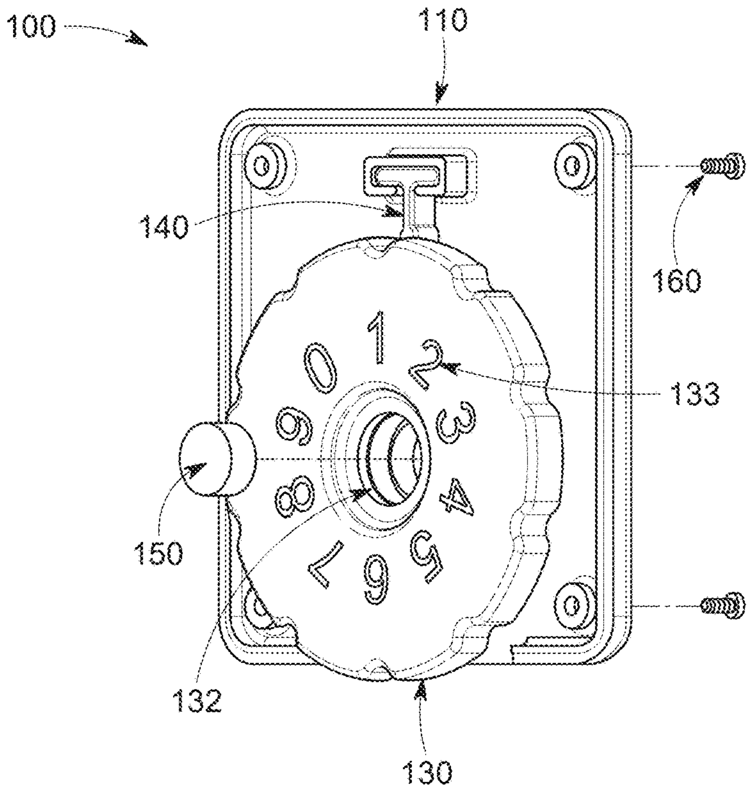
FIG. 1D is a pictorial illustration of the magnetic rotational set counter of an interior view of the magnetic rotational set counter.

FIG. 1D shows an interior view of the number disk 130 as well as illustrates an exemplary magnet 150 and ticker 140 utilized in the set counter 100. The number disk 130 can freely but limitedly rotate within the interior of the set counter 100. The number disk 130 includes a center hole 130 for receiving the circular shaped magnet 150. The magnet 150 may be inserted therein in order to fit inside of the center hole 132 of the number disk 130 and also to fit against the interior facing side of the back plate 110. The set counter 100 advantageously includes the magnet 150 which allows the set counter 100 to be magnetically held onto a metal surface, such as those commonly found near or around where a user performs exercises.

FIG. 1F shows for example the assembled set counter 100 magnetically attracted to and held onto a surface of a metal post 176 that may be part of a weightlifting rack or equipment because of the enclosed magnet insert 150 held within the interior of the set counter 100. It is convenient for the user to be able to simply position the set counter 100 anywhere as needed onto a post, such as metal post 176 of the exercise equipment or unit that the user is exercising next to. It is noted that the set counter 100 may be held via the enclosed magnetic insert 150 onto any type of surface that is magnetically attracted to the magnet 150, including but not limited to refrigerators, exercise equipment, white boards or chalkboard, or any type of surface available to a user during his or her exercising routine.

Figure 1E:
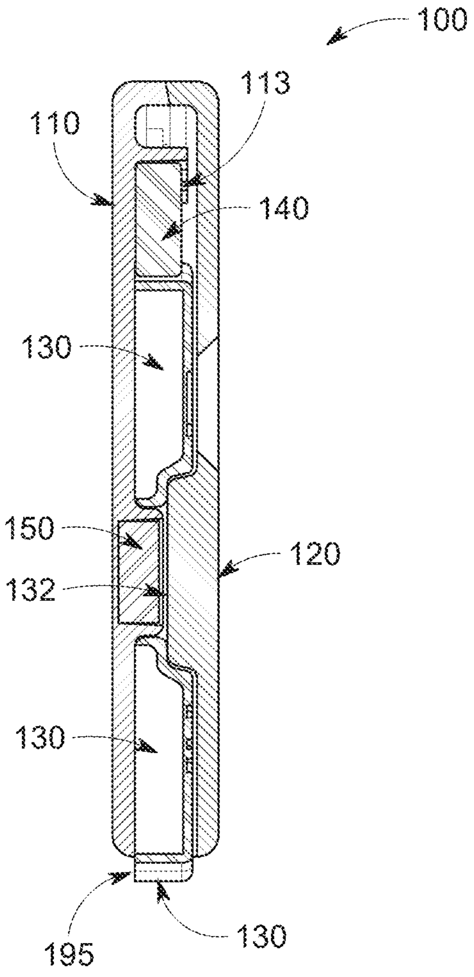
FIG. 1E is a pictorial illustration of a cross-sectional view of the magnetic rotational set counter taken along line A-A shown in FIG. 1B.
Figure 1F:
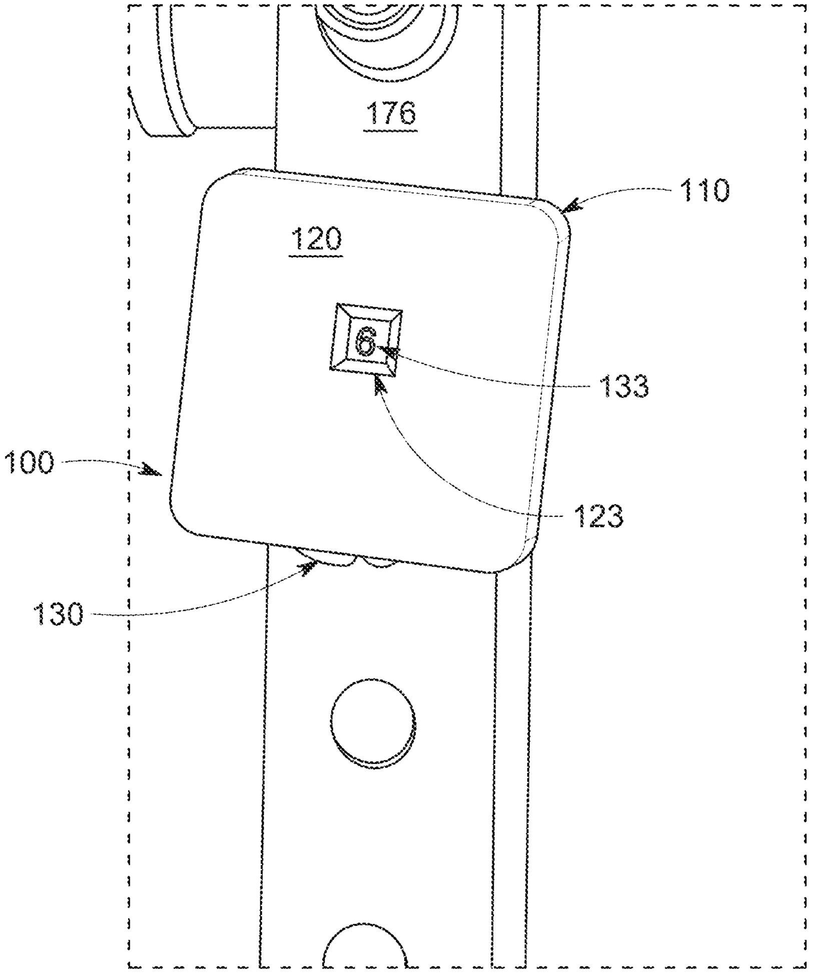
FIG. 1F is a pictorial illustration of the magnetic rotational set counter magnetically attached to a magnetically receptive post which in this exemplary view of weightlifting equipment.

FIG. 1E shows a sectional view of the set counter 100 that a user may use to count out exercise sets. The sectional view shown in FIG. 1E may be taken along line A-A as shown in FIG. 1B. The sectional view shows that the front plate 120 is attached to the back plate 110 and the number disk is sandwiched between the front plate 120 and the back plate 110 along with the trapped magnetic insert 150 that rests in the center hole 132 of the number disk 130 that is also resting against the interior surface of the back plate 110. Further, a lower portion 195 of the number disk 130, as shown in FIG. 1E, protrudes beneath the access window 114, such that the lower portion 195 is accessible to the user in order to rotate or turn the number disk 130. The lower portion 195 of the number disk 130 will vary as the number disk 130 is manually turned or rotated forward similar to a carousel wheel. In doing so, the numbers 133 on the number disk 130 can turn as well and become visible through the display window 123 which is integrated into the front plate 120. The ticker 140, is shown in FIG. 1E as well. The ticker 140 serves to assist in preventing the number disk 130 from rotating backward unintentionally and miscounting. The ticker 140 may be made of a durable, elastic, bendable material, such as a bendable silicone or rubber and/or plastic. Further information is provided with respect to the ticker 140 in the sections below.

Figure 3A:
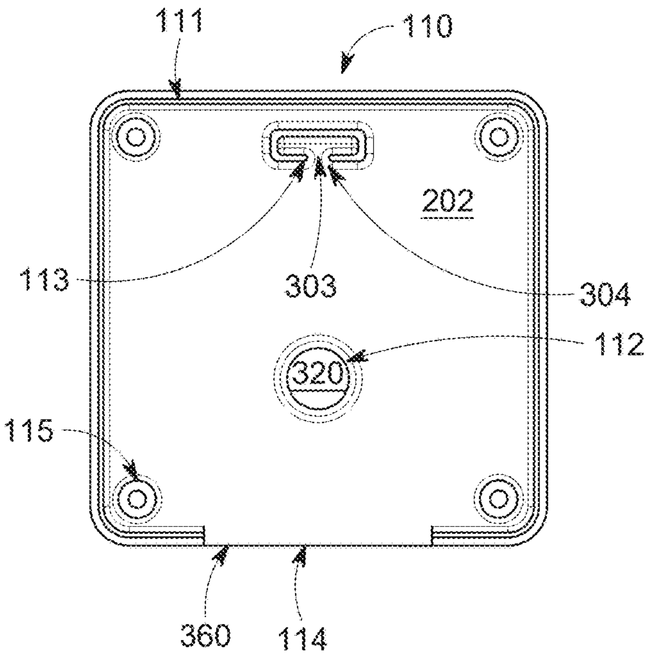
FIG. 3A is a pictorial illustration of a front view of the rear plate of the set counter.
Figure 3B:
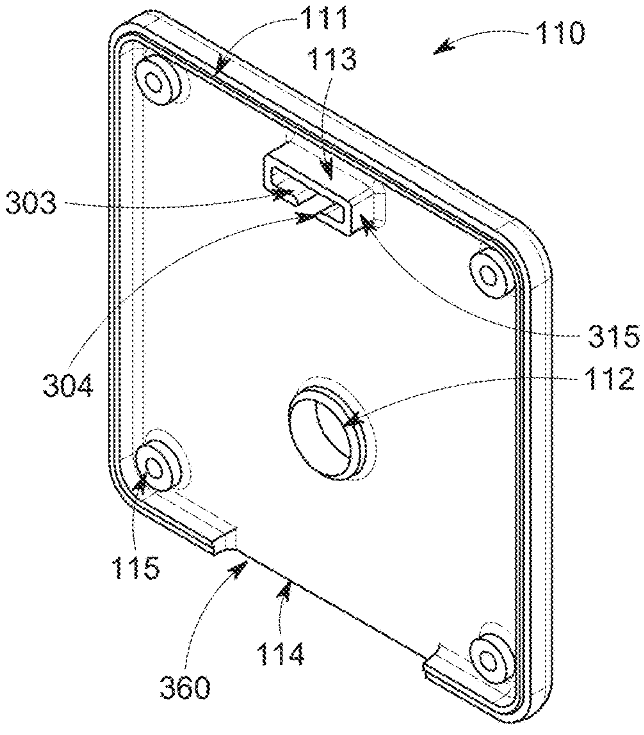
FIG. 3B is a pictorial illustration of a perspective view of the rear plate of the set counter.

An exemplary embodiment of the back plate 110 is shown in FIG. 3A and FIG. 3B, while an exemplary embodiment of the front plate 120 is shown in FIG. 4A and FIG. 4B. The back plate 110 and the front plate 120 may be generally rectangular in shape in one or more non-limiting embodiments. It is noted that other shapes are contemplated and may alternatively be used for the front plate 120 and the back plate 110, including a circular shape.

Figure 6A:
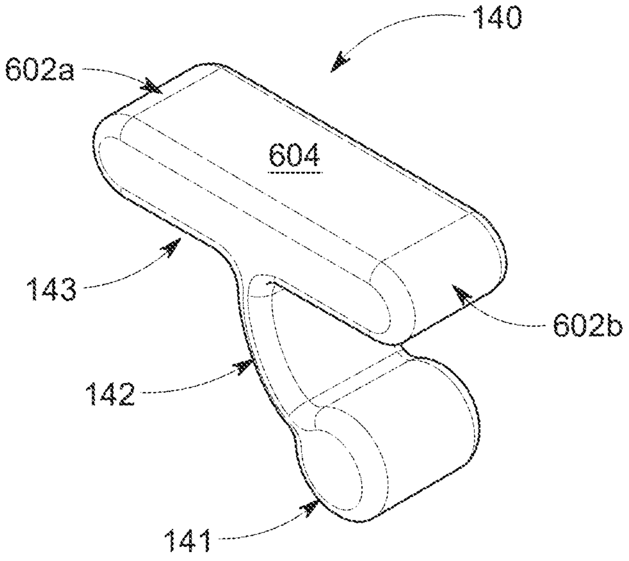
FIG. 6A is a pictorial illustration of a ticker of the set counter.

The back plate 110, as shown for example in FIG. 3A may have a mating edge 111 that extends around the perimeter of the back plate 110 configured to mate with the mating edge 121 that extends around the perimeter of the front plate 120, as shown for example in FIG. 4A. The back plate 110 may include the ticker housing 113 as shown in FIG. 3A and FIG. 3B. As shown in FIG. 3B, the ticker housing 113 has some thickness 315, that can tightly hold the top piece 143 (e.g. as shown in FIG. 6A) of the ticker 140. The back plate 110 may include a number of holes or towers 115 to hold the fasteners 160 in place. There may be a magnet housing 112 included in the back plate 110 as well as shown in FIG. 3A and FIG. 3B. The center hole 132 of the number disk 130 may be positioned such that the center hole 132 of the number disk 130 sits over the cavity 320 of the magnet housing 112 or is aligned with the center hole 320 of the magnet housing 112. The magnet 150 may be inserted through the center hole 132 of the number disk 130 and into place in the cavity 320 of the magnet housing 112 that is built into the back plate 110 of the set counter 100. In a non-limiting embodiment, the magnet 150 may be round shaped to fit within the center hole 132 of the number disk 130 and into the round shaped cavity 320 of the back plate 110.

In a non-limiting embodiment, the mating edge 111 of the back plate 110 and the mating edge 121 of the front plate 120 may have a gap 360. In this manner, when the front plate 120 is joined to the back plate 110, the access window 114 is formed so that the lower portion 195 of the number wheel 130 can protrude through the access window 114 and the user can use the user's fingers to turn or advance the number wheel 130 manually. Accordingly, the number wheel 130 is not fully contained or enclosed by the outer perimeter of the front plate 120 or the back plate 110 at the bottom surface 106 of the assembled set counter 100. The top surface, left side, and right side of the number wheel 130 are enclosed and held between the front plate 120 and the back plate 110 of the assembled set counter 100.

FIG. 4A and FIG. 4B illustrate an exemplary embodiment of the front plate 120 which may include a cutout display window 123 as shown. Additionally, there may be a disk housing 122 that functions to retain the magnet 150 as well as the center axis for the number disk 130.

Figure 2A:
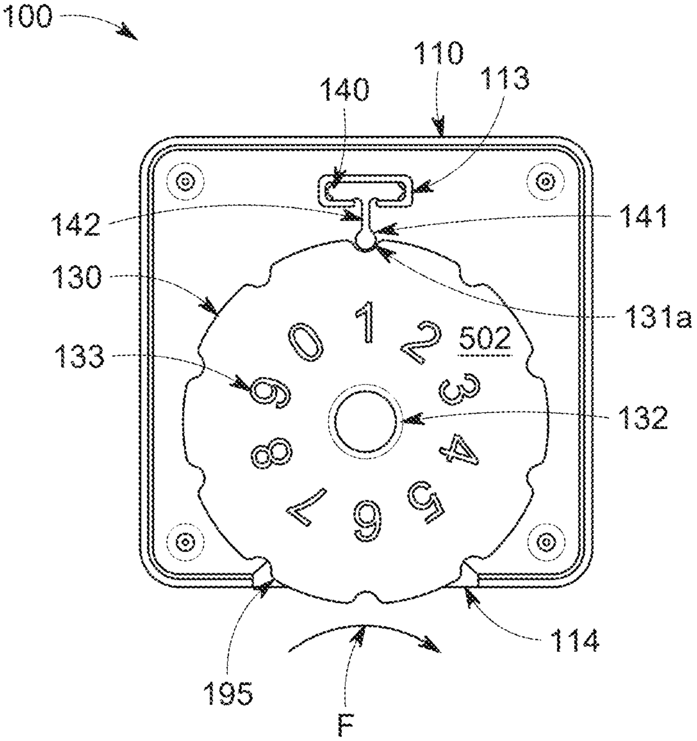
FIG. 2A is a pictorial illustration of a back plate and a ticker and a number plate of the magnetic rotational set counter whereby the ticker is stationary prior to rotational movement being imparted on the number disk.
Figure 2B:
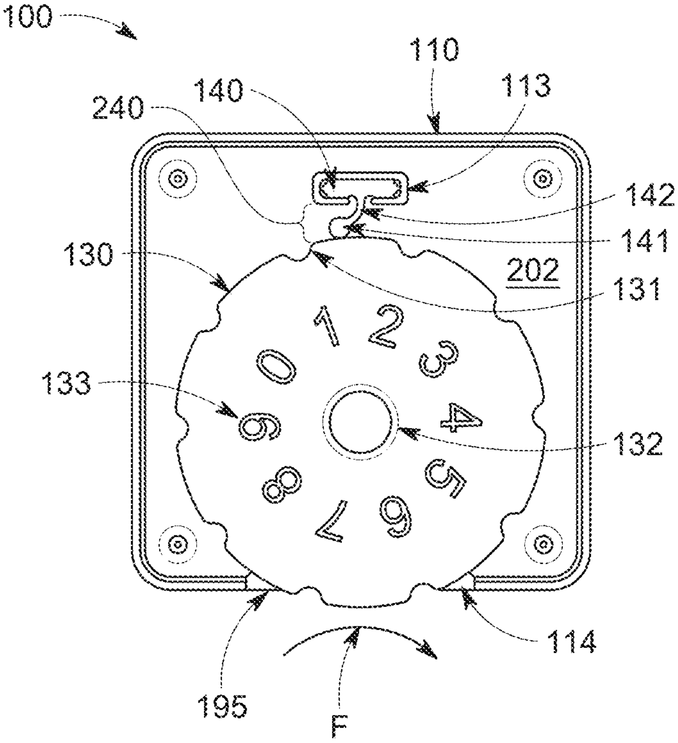
FIG. 2B is a pictorial illustration of a back plate and the ticker and the number plate with the arm of the ticker displayed as transitioning and rising over the number disk as the rotational movement is imparted onto the number disk.
Figure 7A:
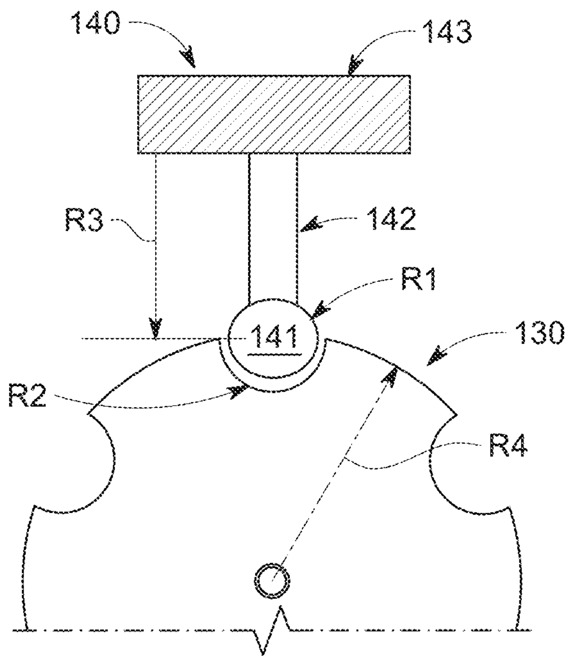
FIG. 7A is a pictorial illustration of the ticker and the number disk of the set counter.
Figure 7B:
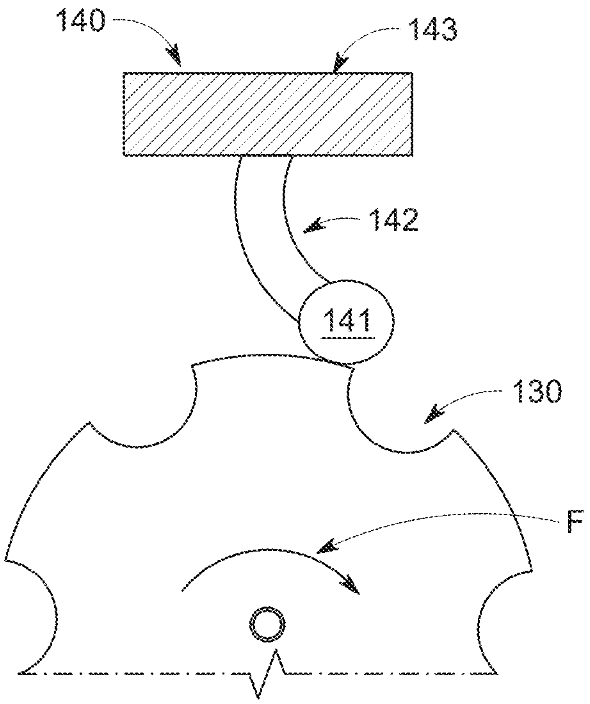
FIG. 7B is a pictorial illustration of the ticker and the number disk of the set counter.

FIG. 2A and FIG. 2B show how the number disk 130 is configured to receive rotational direction in a preferably forward direction as shown by arrow F as shown in FIG. 2A and FIG. 2B and in FIG. 7B. The user may rotate the lower portion 195 of the number disk 130 which is accessible to the user's fingers through the access window 114 of the assembled set counter 100. In rotating the lower portion 195 of the number disk 130, the user causes the number disk 130 to rotate in the direction of arrow F which is in a forward direction or a single direction.

As shown in FIG. 2A and in FIG. 2B, the ticker 140 is housed in a ticker housing 113. It is noted that the number wheel 130 is positioned lower than the interiorly positioned ticker housing 113 and ticker 140, as shown in FIG. 2A and FIG. 2B. The ticker housing 113 may be integrated into the interior facing surface of the back plate or rear plate 110. FIG. 6A and FIG. 6B show a closer up view of the ticker 140 itself. The ticker 140 is composed of a top piece 143, a follower arm or elastic arm 142, and a follower ball 141 as shown in FIG. 6A. The top piece 143 may be horizontally oriented as shown in FIG. 6A and FIG. 6B. The top piece 143 may have curved side ends 602*a*, 602*b* and a generally flat top surface. The follower arm 142 may descend vertically from the top piece 143. In a non-limiting embodiment, the follower arm 142 may be centrally positioned in relation to the horizontal top piece 142 and may be perpendicular to the top piece 143 of the ticker 140. A bottom end 141 of the ticker 140 is configured to act as a stopper when positioned in the one or more notches 131 of the number disk 130 (e.g. as shown in FIG. 5B). In a non-limiting embodiment, the bottom end 604 of the ticker 140 may be the same as the follower ball 141 as shown in FIG. 6A and FIG. 6B. The follower ball 141 of the ticker 140 may be formed as a cylinder or another shape having some depth and thickness and a radius, such as radius R1 as shown in FIG. 6B. The ticker 140 is configured to fit securely within the ticker housing 113 of the back plate 110.

Returning to FIG. 2A, the ticker housing 113 defines a cavity 303 (e.g. as shown in FIG. 3A) that has the same width and depth as the top piece 143 of the ticker 140. The top piece 143 of the ticker 140 can fit into the cavity 303 of the ticker housing 113 and the follower, elastic arm 142 and follower ball 141 of the ticker 140 descends from an opening, such as opening 304 as shown in FIG. 3A and FIG. 3B, in the ticker housing 113. The follower ball 141 is configured to fit into the proximate notch 131, such as notch 131*a*, as shown in FIG. 2A of the number disk or wheel 130. The ticker housing 113 is positioned a minimal distance 240, as shown in FIG. 2A, above a top surface of the number wheel 130 in order to provide enough room for the follower arm 142 and follower ball 141 of the ticker 140 to dangle from the top piece 143 of the ticker 140 while located or held in place in the ticker housing 113. There may be a somewhat tight fit or tolerance between the bottom surface of the ticker housing 113 and a top surface of the number disk 130.

Figure 5A:
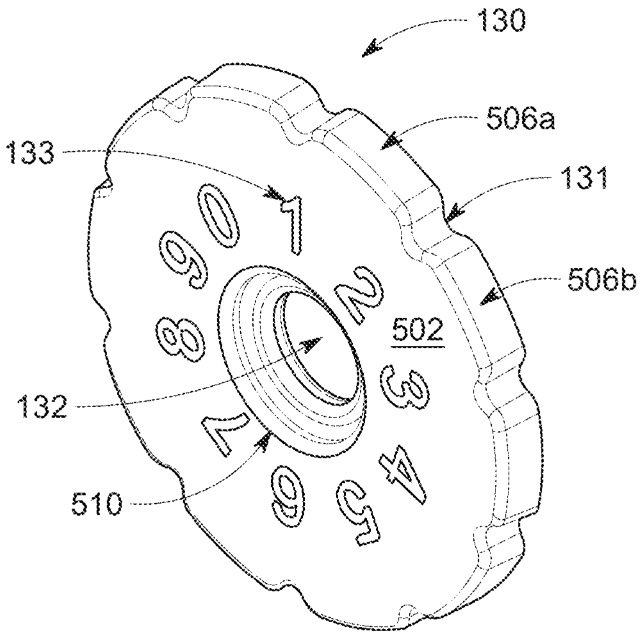
FIG. 5A is a pictorial illustration of a front view of the number disk of the set counter.
Figure 5B:
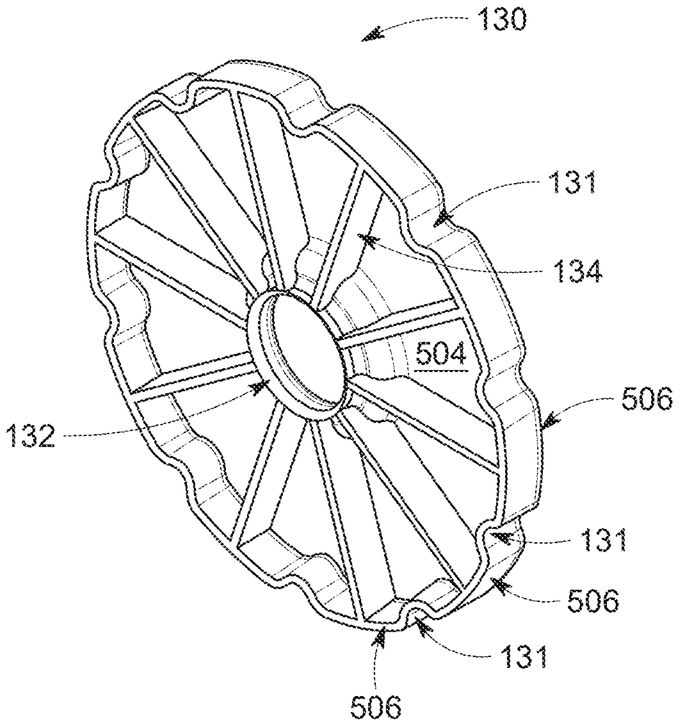
FIG. 5B is a pictorial illustration of the rear view of the number disk of the set counter.
Figure 6B:
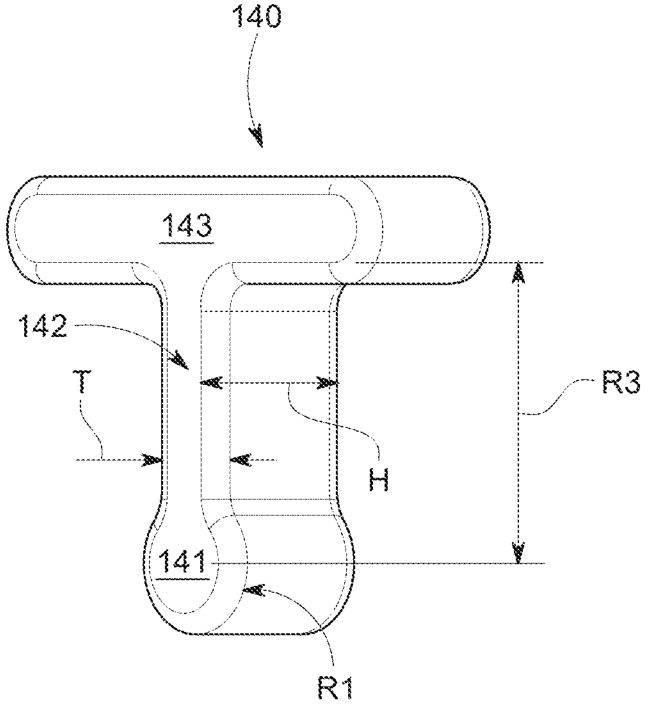
FIG. 6B is a pictorial illustration of a ticker of the set counter.

FIG. 5A and FIG. 5B show front and back views of the number disk or wheel 130 according to one or more non-limiting embodiments. The number wheel 130 may be generally wheel shaped or circular shaped. On a front side 502 of the number disk 130, there may be a chronological array of numbers 133. In a non-limiting embodiment, the numbers 133 may at least range from 0 to 9, however this is non-limiting as the range may increase to higher numbers as well. The numbers 133 may be evenly spaced out through one full rotation.

The numbers 133 are arranged in a clockwise order and are positioned near the center hole 132 of the number disk 130. When a user rotates the bottom portion 195 of the number wheel 130 that protrudes through the access window 114 of the set counter 100, the selected number 133 on the number wheel 130 will automatically change as displayed through the display window 123 of the set counter 100 (e.g. as shown in FIG. 1A). The numbers 133 are intended to advance to a higher number in accordance with the concept that the user continues to turn the wheel to reflect increasing the number of sets for the user's particular exercise that the set counter 100 is used to monitor. The numbers 133 may be printed or inscribed onto a front surface 502 of the number wheel 130 and may be prominently displayed and larger in size so as to be easily viewed or read from a distance through the display window 123 in one or more non-limiting embodiments.

The number wheel 130 includes multiple raised ridges 506 and recessed notches 131, whereby a notch 131 exists in between each ridge (e.g. between ridge 506*a* and 506*b* as shown in FIG. 5A). The number wheel 130 may have a smaller outer diameter than the width of the front plate 120 and the back plate 110 as the number wheel 130 is configured to fit between the front plate 120 and the back plate 110.

In a non-limiting embodiment, there may be ribs 134 that are positioned all around on the back surface 504 of the number disk 130, as shown in FIG. 2B, and around the center hole or cavity 132 of the number disk 130. The ribs 134 may each provide additional support and stability to the number disk 130. In other non-limiting embodiments, the ribs 134 may be omitted. The back view shown in FIG. 2B of the number wheel 130 further shows how the notches curve inward towards the center hole 132 of the number disk 130 with respect to each adjacent ridge 506.

As shown in FIG. 2A and FIG. 2B, when the ticker 140 is at rest and the number disk 130 is not being rotated forward by a user, the follower ball 141 of ticker 140 remains stationary and at rest in between each adjacent ridge (e.g. ridges 502*a* and 502*b*) within the respective notch 131. Upon turning the number disk 130 in a forward direction (e.g. as shown by arrow F in FIG. 2B), the follower arm 142 and follower ball 141 bend to move or travel over the top of the ridge 506 of the number wheel 130 until the follower arm 142 and follower ball 141 arrive at the next notch 131 in the number disk 130 and are prevented from moving by an adjacent sidewall of a ridge 506 of the number disk 130. FIG. 5A shows that there may be an interior sloping or recess 510 as part of the center of the number wheel 130 towards its center cavity 132. This recess 510 may be sized to accept the disk housing 122 on the front plate 120, ensuring that the number disk 130 is installed correctly with the numbers 133 facing forward and available to face through the display window 123.

FIG. 6A and FIG. 6B show the follower arm 142 and follower ball 141 of the ticker 140 in bent or flexed positions as they would appear during the transitions from one notch 131 to another notch 131 over adjacent ridges 506 of the number wheel 130. FIG. 6B and FIG. 7A show the elastic, follower arm 142 and ball 141 of the ticker 140 in a straight, stationary, relaxed position which occurs when the follower arm 142 and ball 141 of the ticker 140 matches with a stop notch 131 of the number wheel 130. The radius of the elastic follower ball 141 is optimized in order to reduce wear and tear as the follower ball 141 of the ticker 140 interacts with the stop notches 131 of the number wheel 130. The elastic, follower arm 142 is an extension that connects the elastic follower ball 141 to the top piece 143 of the ticker 140. The length of the elastic follower arm 142 is such that the elastic follower arm 142 can handle a long lifecycle of side bending through use.

FIG. 6B highlights variable parameters of the ticker 140. Variable T is the thickness of the elastic follower arm 142. Variable H is the height of the elastic follower arm 142. By adjusting these two variables, the load required to bend the elastic follower arm 142 can be changed or optimized. R3 is the effective radius of the ticker 140. This distance for the R3 is determined by measuring the base of the elastic follower arm 142 to the contact point made by the elastic follower ball 141 of the ticker 140. Radius R1, as shown in FIG. 6B, is the radius of the elastic follower ball 141 or the general profile/parameter of the elastic follower ball 141. By adjusting radius R1, the torque curve needed to rotate the number disk 130 changes as well.

FIG. 7A and FIG. 7B help to illustrate details of the elastic radial double cam mechanism of the ticker 140 as the ticker 140 interacts with the number wheel 130. In FIG. 7A, the variable parameters of the mechanism are highlighted. As mentioned above, R3 is the effective radius of the elastic follower arm 142 and is measured vertically from the point of contact that the ticker 140 makes with the number wheel 130 to the top piece 143 of the ticker 140. R3 thereby provides the effective moment arm that provides resistance of rotation to the number disk 130, which may be generally referred to or compared to the role of a cam. R1 is the radius or effective profile of the elastic follower ball 141. Because the elastic follower ball 141 makes contact with the number disk 130 (e.g. the cam), it is part of variable R3. Changes in radius R1 affect the variable radius R3. Radius R4 represents the outer diameter of the number disk 130. This profile is what makes the mating contact to the elastic follower ball 141 which has radius R1. Naturally, radius R4 is measured from the rotational axis of the number disk 130 to the point of contact made with radius R1 of the elastic follower ball 141. Furthermore, radius R2 of each stop notch 131 of the number disk 130 is the complementary profile to the radius R1 of the elastic follower ball 141 of the ticker 140. The profile of radius R2 is limited by the profile length of radius R4 such that the size and number of R2 instances should preferably fit within the R4 profile. It is important to note that the movement of this mechanism R3+R4=C, where C is a constant. One other key features of this mechanism is that once the rotational direction of the number disk 130 has been initiated, and radius R1 is in full contact with the outer most profile of radius R4, it will be hard to reverse the direction rather than continue in the already set rotational direction of the number disk 130.

Notably, the number disk 130 is able to rotate in a forward and backward direction equally. However, once the direction of rotation is initiated, and the number disk 130 rotates past a certain point, it will be harder to rotate the number disk 130 back than to keep it rotating in the originally initiated direction due to the follower arm 142 and follower ball/ cylinder 141 of the ticker 140 which minimize movement in an opposite direction once the rotation is initiated. The number disk 130 in a sense acts like a gear and the elastic ticker 140 with its elastic follower arm 142 and ball 141 function to temporarily lock or stop the number disk 130 from rotating unless intentionally forced to by the user actively or manually turning the number disk 130 (i.e. at a lower portion 195 that is exposed from the bottom of the set counter 100 through the access window 114). When the force of the user's fingers pushes the number disk 130 in a forward direction (e.g. arrow F), the number disk 130 will naturally turn and the ticker 140 is forced to rise up again over the ridges 506 of the number disk 130 until another notch 131 is reached whereby the elastic follower ball 141 naturally fits or stops in place thereby stopping the number disk 130 from advancing. A display number 133 is then displayed through the display window 123 of the set counter 100.

A number of advantages are offered by the set counter 100 as shown in FIG. 1A-FIG. 7B. Notably, the set counter 100 incorporates a magnet 150 that causes the set counter 100 to be magnetically and removably attachable to a corresponding magnetically attracting surface. This may be very useful in gyms or other areas where there are many metal surfaces for the user to position the magnet set counter 100. Further, the access window 114 of the set counter 100 provides the user with easy access to the lower portion 195 of the number disk 130 so that the user can manually turn or rotate the number disk 130 in a forward direction (e.g. arrow F) in order to advance through the numbers 133 of the set counter 100 during the exercise sets. The set counter 100 helps the user to keep track of the number of sets completed and prevents the user from miscounting. Having a set counter, such as set counter 100, may make a user more motivated to complete all of the required sets to effectively workout and target the user's muscles.

The components of the set counter 100 are designed to withstand long lifecycle, including the ticker 140, which incorporates a bendable, elastic arm 142 and follower ball 140 that mate with the stop notches 131 of the number disk 130 in a manner similar to that of a cam and follower.

It should be understood that the invention is not limited in its application to the details of the particular arrangement shown in this disclosure and is well capable of other embodiments different than shown in this disclosure. It should therefore also be understood that the invention is not limited to the embodiment descriptions above but encompasses any and all embodiments within the scope and spirit of the inventions as claimed.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "set" as used herein may refer to one or more items. Accordingly, "set" may mean a single item or more than one item.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. An apparatus comprising:

a magnetic rotational set counter, comprising:

a magnet;

a number disk having a set of numbers on a front side of the number disk, wherein the number disk is generally circular in shape and includes a plurality of notches on an outer edge or profile of the number disk and a central cavity, wherein the magnet is inserted into the central cavity of the number disk;

a ticker, wherein the ticker comprises an elongated arm and an end piece on the elongated arm;

a back plate, wherein the back plate further comprises:

a body having a set of holes for receiving fasteners therethrough;

a housing to house the ticker on the back plate; and a front plate, wherein the front plate is attached to the back plate, wherein the number disk is positioned between the front plate and the back plate and in front of the magnet, wherein an access window is formed at a bottom section of the magnetic rotational set counter, wherein the access window is formed between the front plate and the back plate, and wherein a bottom portion of the number disk protrudes through the access window such that one or more notches of the plurality of notches are visible through the access window at the bottom section of the magnetic rotational set counter.

2. The apparatus of claim 1, wherein the front plate comprises a display window for displaying a single number from the set of numbers on the number disk, wherein the display window is an opening in the front plate sized to display the single number from the set of numbers.

3. The apparatus of claim 2, wherein the single number from the set of numbers is visible when looking at a front side of the magnetic rotational set counter.

4. The apparatus of claim 1, wherein numbers of the set of numbers are arranged in chronological order on the number disk.

5. The apparatus of claim 1, wherein the elongated arm and the end piece of the ticker are configured to move from a straight, stationary position to a bent turned position when the number disk is rotated in a forward direction at the access window of the magnetic set rotational counter.

6. The apparatus of claim 1, wherein the number disk has raised portions above each notch of the plurality of notches.

7. The apparatus of claim 6, wherein the end piece of the ticker is configured to fit into a notch of the plurality of notches on the number disk, and wherein the end piece of the ticker is either at rest in the notch of the plurality of notches or bent to one side on a raised portion of the raised portions while the number disk is turning.

8. The apparatus of claim 1, wherein a top piece of the ticker is a horizontal piece and the elongated arm and the end piece are connected to a center of the top piece or are integrally formed with the ticker.

9. The apparatus of claim 1, wherein the end piece of the ticker is cylinder.

10. The apparatus of claim 1, wherein a back portion of the number disk comprises support ribs.

11. The apparatus of claim 1, wherein the magnet is trapped in place inside of the cavity of the number disk and also between the back plate and the front plate of the magnetic rotational set counter.

* * * * *